United States Patent

[11] 3,628,086

| [72] | Inventor | Joe A. Nuckolls<br>Hendersonville, N.C. |
|---|---|---|
| [21] | Appl. No. | 857,010 |
| [22] | Filed | Sept. 11, 1969 |
| [45] | Patented | Dec. 14, 1971 |
| [73] | Assignee | General Electric Company |

[54] HIGH-FREQUENCY LAMP-OPERATING CIRCUIT
19 Claims, 3 Drawing Figs.

[52] U.S. Cl. ..................................................... 315/100,
315/199, 315/227, 315/244, 315/283
[51] Int. Cl. ........................................................ H05b 37/00
[50] Field of Search........................................... 315/1000,
199, 226, 227, 244, 258, 283, 289

[56] References Cited
UNITED STATES PATENTS
3,170,085   2/1965   Genuit........................... 315/227

3,235,769   2/1966   Wattenbach................. 315/100 U
3,344,311   9/1967   Nuckolls ....................... 315/100 U

*Primary Examiner*—Roy Lake
*Assistant Examiner*—Lawrence J. Dahl
*Attorneys*—Sidney Greenberg, J. Wesley Haubner, Frank L. Neuhauser, Oscar B. Waddell and Joseph B. Forman

ABSTRACT: High-frequency circuit for operating gaseous discharge lamps includes an inductor-capacitor resonant circuit having the lamp load connected across the inductor, and a pair of silicon-controlled rectifiers operated alternately by a unijunction oscillator-triggering circuit to provide for controlled series resonance of the resonant circuit for producing high-frequency voltage across the inductor for energizing the lamp load.

Inventor,
Joe A. Nuckolls,
by Sidney Greenberg
His Attorney.

Inventor,
Joe A. Nuckolls,
by Sidney Greenberg
His Attorney

Inventor,
Joe H. Nuckolls,
by Sidney Greenberg
His Attorney.

HIGH-FREQUENCY LAMP-OPERATING CIRCUIT

The present invention relates to high-frequency circuits for starting and operating loads such as gaseous discharge lamps.

It is an object of the invention to provide a high-frequency circuit which provides improved control of the operation of loads such as gaseous discharge lamps.

It is another object of the invention to provide a high-frequency circuit of the above type which is simple and compact in construction and readily produced at low cost, is reliable in operation, versatile in application, and capable of control over a wide range of conditions to obtain desired operating results.

Still another object of the invention is to provide a circuit arrangement of the above type embodying a high-voltage starting means.

Another object of the invention is to provide a circuit of the above type incorporating means for compensating for variations in load-operating conditions.

Other objects and advantages will become apparent from the following description and the appended claims.

With the above objects in view, the present invention relates to a circuit for starting and controlling the operation of a load comprising, in combination, a source of current, an inductor and a capacitor connected in series across the source and forming a series resonant circuit, first and second controlled rectifiers connected in series across the source, the resonant circuit connected to the junction of the controlled rectifiers with one of the controlled rectifiers in series conduction relation with the resonant circuit and the other controlled rectifier connected across the resonant circuit, a load connected across the inductor for energization thereby, and triggering means connected to the controlled rectifiers for alternate actuation thereof, whereby the alternate energizing of the controlled rectifiers provides controlled series resonance of the series resonant circuit producing high-frequency voltage across the inductor for energizing the load.

The invention will be better understood from the following description taken in conjunction with the accompanying drawings in which.

Figure 1:
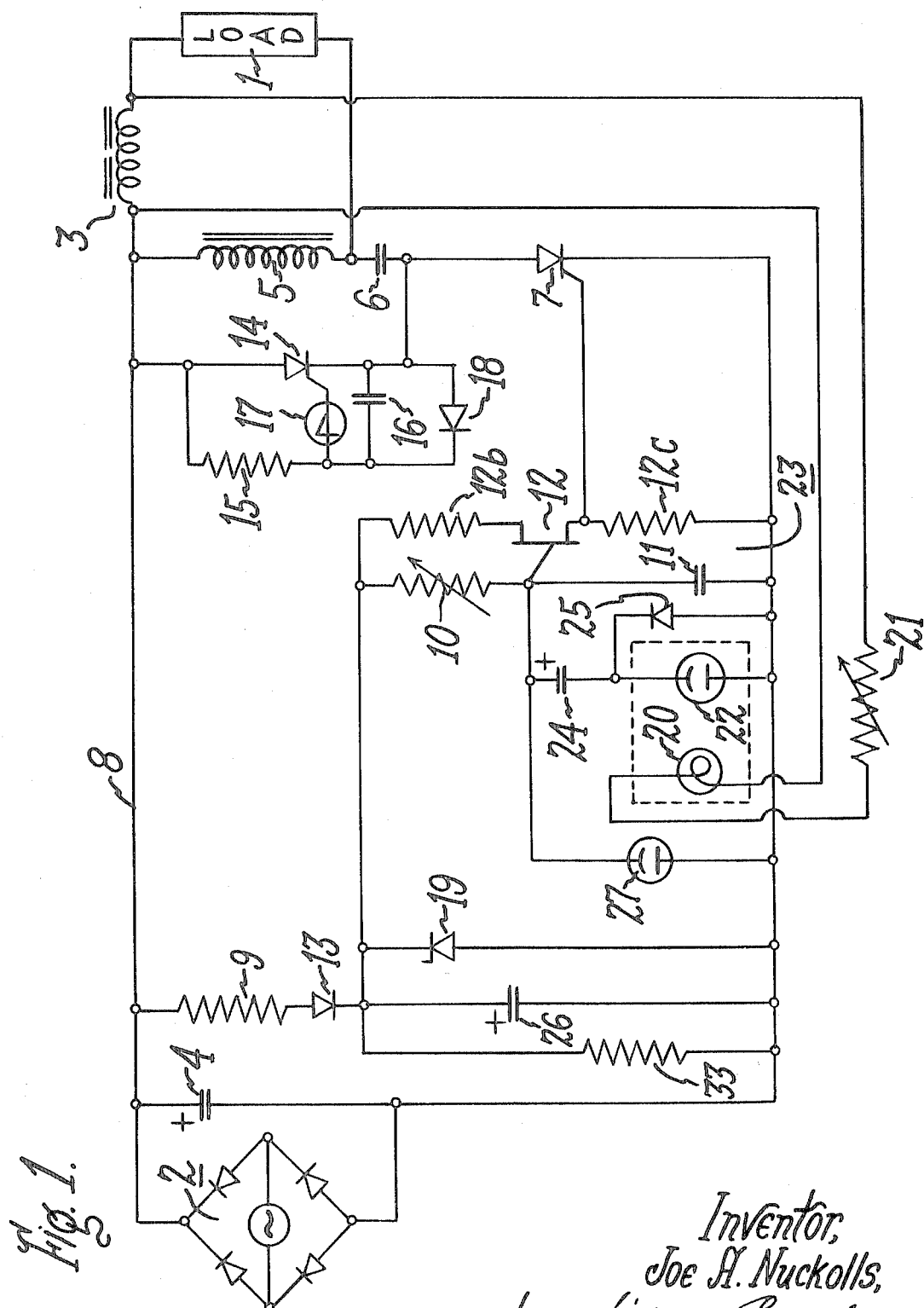
FIG. 1 is a circuit diagram of high-frequency circuit embodying the invention for operating a gaseous discharge lamp.

Referring now to the drawings, and particularly to FIG. 1, there is shown a circuit diagram illustrating an embodiment of the high-frequency control circuit of the invention. As shown, the circuit for starting and operating gaseous discharge lamp 1, such as a mercury vapor or sodium vapor lamp, comprises a full-wave rectifier bridge 2 for operating the lamp load from an alternating current source of, e.g., 120 volts and connected to lamp 1 via series-connected ballast inductive reactor 3 which provides current-limiting impedance for the lamp. Connected across bridge rectifier 2 for receiving energy therefrom is storage capacitor 4 which serves as a stiff source of energy and may be of selected magnitude for providing the desired degree of 120 c.p.s. ripple. Connected across lamp 1 and inductance 3 is inductor 5, and arranged in series circuit therewith and with storage capacitor 4 are capacitor 6 and a controlled switch such as silicon-controlled rectifier SCR 7.

The operation of SCR 7 is controlled by an actuating or triggering circuit 23 which in the illustrated embodiment includes unijunction transistor UJT 12 connected at one base to conductor 8 via resistor 9 and diode 13, and at the other base to the cathode of SCR 7, and an RC time constant network comprising series-variable resistance 10 and charging capacitor 11 connected across UJT 12, with the emitter of the latter connected to the junction of resistance 10 and capacitor 11. Zener diode 19 connected across the RC network limits the voltage applied to the actuating circuit 23, e.g., about 28 volts.

In the described circuit, capacitor 6 forms with inductor 5 a series-resonant circuit which upon firing of SCR 7 effects charging of capacitor 6. To provide for discharging of capacitor 6 in order to permit full cycle oscillation of the resonant circuit, SCR 14 is connected across inductor 5 and capacitor 6 to form a series discharge loop therewith. A time delay circuit comprising resistor 15 and capacitor 16 is connected across SCR 14 and is connected to the gate electrode of the latter via a unidirectional voltage sensitive switch such as Shockley diode 17. Diode 18 connected across capacitor 16 serves to prevent any reverse voltage from appearing on the gate electrode of SCR 14.

In the operation of the described circuit, bridge rectifier 2 converts the alternating current from the source to pulsing direct current, placing energy on storage capacitor 4, as well as charging capacitor 11 in actuating circuit 23. When the voltage buildup in capacitor 11 reaches the breakdown voltage of UJT 12, which functions as a voltage-sensitive switch, the UJT fires, triggering SCR 7 via its control electrode, and charging of capacitor 6 is effected as the resonant circuit comprising inductor 5 and capacitor 6 undergoes partial oscillation. As a result, a voltage greater than the instantaneous voltage across capacitor 4 appears across capacitor 6. When the voltage across capacitor 6 reaches approximately twice the instantaneous voltage across capacitor 4, SCR 7 will turn off due to being reverse biased. SCR switch 14 is slaved to this voltage, and after a time delay, dependent on the magnitude of resistor 15 and capacitor 16, the latter capacitor reaches the breakdown voltage of voltage sensitive switch 17, which becomes conductive and triggers SCR 14 into conduction. As a result, capacitor 6 is discharged through inductor 5. Thereafter, SCR 7 is again gated after a predetermined interval by actuating circuit 23, removing the negative voltage buildup on capacitor 6 and again ringing up the high positive voltage across capacitor 6.

During this series resonant charging and discharging cycle, a near cosine voltage wave form appears across inductor 5 and serves as a stiff high frequency, high-voltage source for lamp 1. Inductor 3 ballasts the lamp, i.e., spreads the lamp current pulse and limits its peak. The effective power receiving resistance of lamp load 1 is reflected back into the series charging-discharging operation as the lamp loads, lowering the Q and reducing the peak voltage across inductor 5. This mechanism provides desirable high sparking voltage and stabilizing reignition voltage for the lamp.

A feedback circuit is preferably provided as shown in FIG. 1 to effect lamp regulation by compensating for variations in source and lamp voltage variations and lamp impedance during starting and operating periods. This circuit includes incandescent lamp 20 connected across inductance 3 and having variable resistor 21 in series therewith. Arranged adjacent incandescent lamp 20 is photoconductor 22 such as a cadmium sulfide cell connected in series with capacitor 24 across capacitor 11. In the operation of the feedback circuit, as the voltage across inductance 3 rises as a function of increased lamp current, incandescent lamp 20 brightens, thus lowering the resistance of photoconductor 22 and resulting in higher charging current in capacitor 24 which is diverted from capacitor 11. The voltage buildup on the latter capacitor is thus delayed and the time between the output pulses of UJT 12 is lengthened. With reduced current in inductance 3, the opposite effect occurs. Thus, the power to the load is maintained constant so that uniform light output may be achieved.

Diode 25 is connected as shown in series with capacitor 24 and across photoconductor 22 to permit discharge of capacitor 24 during triggering of UJT 12. The variable resistor 21 may be adjusted to set the desired level of feedback response.

Resistors 12b, 12c shown in the base circuits of UJT 12 help ensure stable UJT switching and operation by providing a maximum resistive (not frequency sensitive) UJT load during turn-on and conduction, and a limit to any reverse induced voltage generated by current flowing back through the SCR gate electrode during its turn-on which, when flowing into the high impedance of the UJT, sometimes causes unstable and erratic UJT operation.

Filter capacitor 26 may be optionally used in series with resistor 9 and diode 13 as shown to provide continued triggering of the UJT oscillator circuit when the DC output pulse approaches zero magnitude.

If desired, resistor 33 may be used in place of capacitor 26 to force discontinuation of triggering as the DC input voltage approaches zero, when a low magnitude of capacitor 4 is used, therefore allowing a large input ripple with stable triggering and operation which is automatically discontinued at times when a very low-input voltage is available.

To provide for turning off lamp load 1 during daylight hours, photoconductor 27 may be connected across charging capacitor 11 as shown in FIG. 1 and exposed to ambient light, whereby during the daytime when the resistance of photoconductor 27 is at a minimum, current is diverted through the latter away from capacitor 11 so that insufficient voltage is produced to trigger UJT 12 and SCR 7 into operation.

Figure 2:
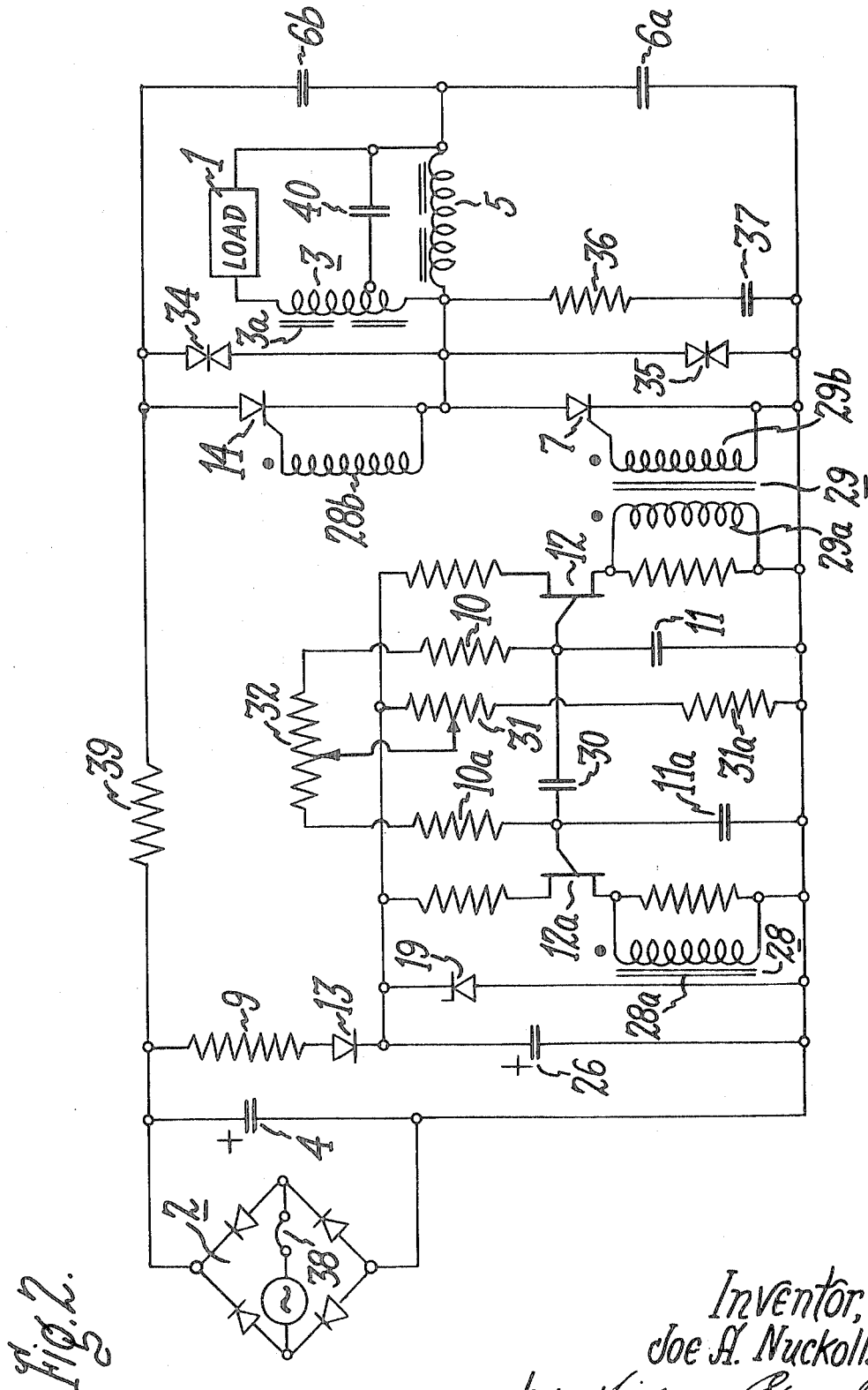
FIG. 2 shows a modification of the FIG. 1 circuit incorporating a different form of actuating circuit and the addition of a high voltage generating circuit for starting the lamp.

FIG. 2 is a circuit diagram showing a modification of the FIG. 1 circuit in which a variable pulse reoccurrence frequency oscillator is used as the triggering circuit for operating both SCR's 7 and 14. In this embodiment, two identical UJT circuits are connected across a common power supply constituted by Zener diode 19 with a common capacitor 30 connecting the emitters of the two unijunction transistors 12 and 12a to provide for operation of only one UJT at a time.

Resistor 10 and capacitor 11 constitute an RC circuit for UJT 12, and resistor 10a and capacitor 11a constitute an RC circuit for the other UJT 12a, these RC circuits being connected by a resistor 32. The resistance of these charging circuits is made variable by adjusting the voltage applied to them, and for this purpose there is provided a potentiometer comprising resistor 31 connected in series with resistor 31a across the RC circuits as shown. When this potentiometer is adjusted, it changes the voltage applied to the charging circuits of the UJT's 12, 12a. The base-to-base voltage of the UJT's is held constant by the voltage-clamping function of Zener diode 19, and consequently the timing provided by the RC circuits is changed as the driving voltage for the charging circuits is changed relative to the fixed base-to-base voltage. Potentiometer 32 connected between the RC timing circuits with voltage applied at the adjustable tap thereon provides for adjustment to correct for circuit dissymmetry and UJT variations which would result in unequal time intervals between the output pulses.

Resistors 10 and 10a also serve as minimum resistance means to provide for limiting the current when potentiometer 31 is set at a high level.

In the operation of the described pulse reoccurrence frequency PRF oscillator, the respective RC charging circuits are alternately charged and the operation of UJT's 12 and 12a is alternately effected. Capacitor 30 serves to interconnect the two charging circuits so as to provide for disabling one as the other is being actuated, and thereby synchronizing the operation of the UJT's. As the impedance of the emitter to ground reaches the low state, capacitor 30 pulls the emitter of the alternate UJT and its charging circuit toward ground, which disrupts its normal charging cycle. As the emitter regains its high impedance state after discharge of its charging capacitor, coupling capacitor 30 is allowed to raise its voltage, thereby effectively releasing the charging circuit which continues its normal charging cycle. This mechanism is repeated on the alternate UJT operation.

As in the FIG. 1 circuit, SCR's 7 and 14 are connected in series across the supply source. In the modification shown in FIG. 2, the SCR's are actuated by means of pulse transformers connected to the respective UJT's. Thus, the primary 28a of pulse transformer 28 is connected to the base one output of UJT 12a and its secondary 28b is connected to the gate electrode of SCR 14, whereas the primary 29a of pulse transformer 29 is connected to the base one output of UJT 12 and its secondary 29b is connected to the gate electrode of SCR 7.

A resonant circuit comprising inductor 5 and capacitor 6a is connected in series with SCR 7 and operates on one-half cycle in the manner previously described in connection with the FIG. 1 circuit. As in the latter circuit, inductor 5 connected across discharge lamp 1 serves as an alternating current operating source for the lamp. Connected effectively in parallel with capacitor 6a is capacitor 6b which, on the other half cycle, provides a discharge through inductor 5 and a path for current to flow from the source which allows current to be drawn from the source when each SCR is fired. This provides a better current wave form to be exhibited to the alternating current source and filter capacitor system.

Thyrectors 34 and 35 are connected respectively across SCR's 14 and 7 to provide a voltage clamping function to protect the SCR's from transient high voltages which may appear across the SCR's.

Resistor 36 and capacitor 37 connected in series and effectively connected across each SCR during a transient voltage state provide a dampening network to dissipate any tendency for very high-frequency oscillation in the circuit.

Circuit breaker 38 connected in series with the alternating current source is an automatic resetting fast circuit breaker which is used to provide circuit interruption in the event both SCR's should be fired simultaneously, allowing their commutation and automatically reestablishing normal circuit operation. Resistor 39 arranged in series in the line may be optionally used to provide minimum resistance for limiting peak currents which can be drawn from the source.

Also shown in FIG. 2 embodiment is a circuit modification which provides high-voltage, low-energy pulses to the lamp load for starting the latter where such pulses are necessary or desirable. The high voltage is generated by tapping inductor 3 using a high turns ratio and connecting the tap through a small high-voltage capacitor 40 to the junction of lamp 1 and inductor 5. High voltage is generated as the respective SCR is fired by action of the steep voltage wave front which appears across inductor 5, hence across the tapped portion 3a of inductor 3, and is momentarily grounded through capacitor 40. This causes the total voltage across inductor 5 to appear across the tapped turns 3a of inductor 3 which, by autotransformer action, steps up this voltage into the kilovolt range momentarily for forcing lamp ionization. Capacitor 40 is small in magnitude relative to the power circuitry and consequently once the lamp is ionized and becomes conductive, the lamp and its supporting power circuitry override the low-energy high-voltage loop.

The polarity of the high-voltage starting pulse may be reversed if desired by interchanging the capacitor 40 connection to inductor 3 with the latter's connection to inductor 5, so that inductor 5 is connected to the tap on inductor 3.

Figure 3:
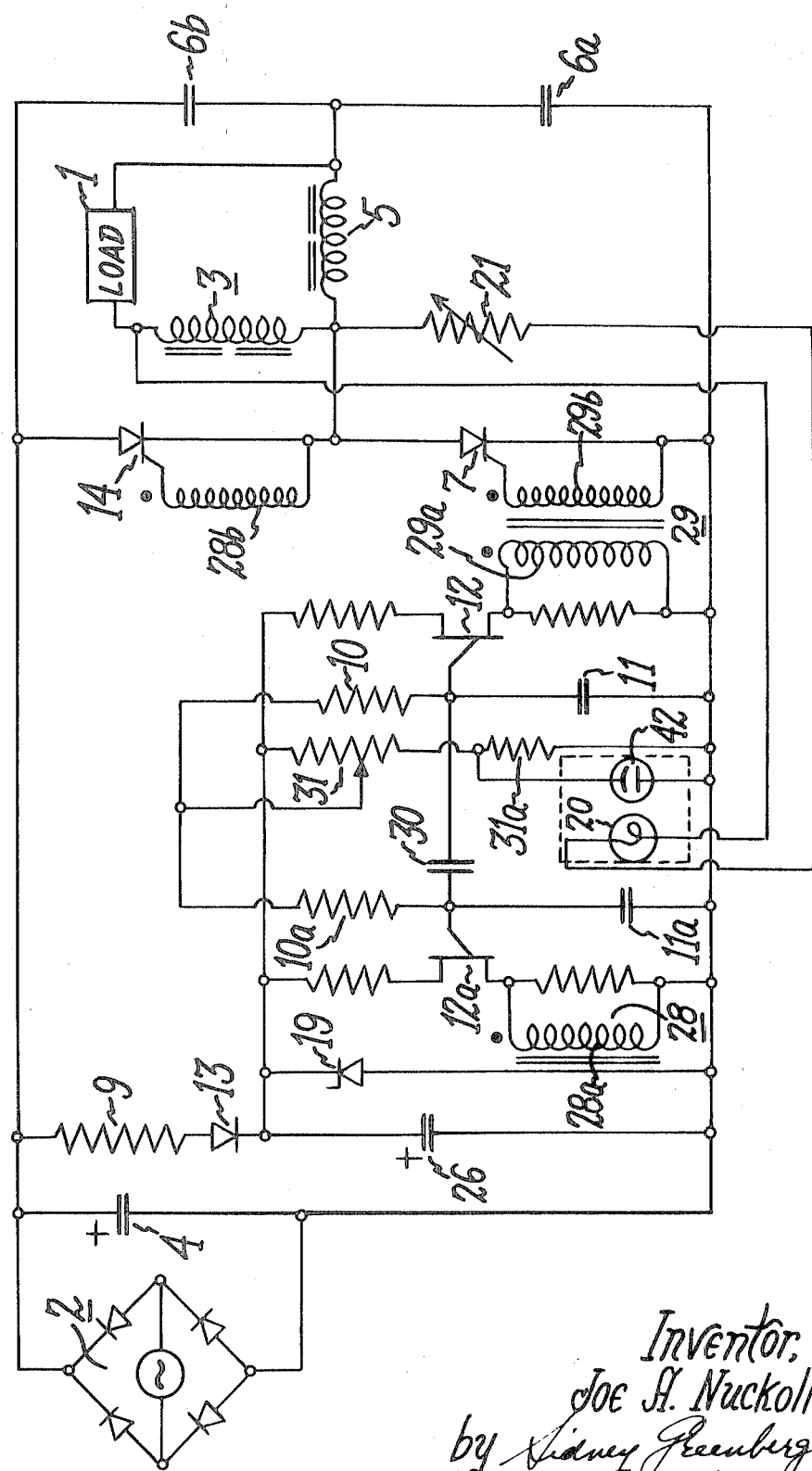
FIG. 3 shows a circuit similar to that of FIG. 2 incorporating feedback means to compensate for variations in lamp-operating conditions.

FIG. 3 is a circuit diagram showing a modification of the FIG. 2 circuit in which a feedback circuit is incorporated for compensating for lamp and input voltage variations. The feedback circuit, similarly to that of FIG. 1, comprises an incandescent lamp 20 connected as shown across inductor 3 in series with variable resistor 21 to sense voltage variations across inductor 3 as a function of the changes in magnitude of the high-frequency lamp load current. Incandescent lamp 20 is arranged in proximity to photoconductor 42, such as a cadmium sulfide photocell, connected in series with and as part of potentiometer 31 of the PRF oscillator circuit described above. Photocell 42 may be connected in parallel with resistor 31a as shown, or take the place of the latter resistor.

In the operation of the feedback circuit, incandescent lamp 20 will brighten with an increase in lamp current, thus reducing the resistance of photoconductor 42 and the resultant voltage divider action reduces the UJT driving voltage relative to the fixed base-to-base potential, hence reducing the trigger pulse reoccurrence rate and reducing the power applied to the lamp load. A reduction in lamp current forces a reverse feedback mechanism to increase the power to the lamp.

While the present invention has been described with reference to particular embodiments thereof, it will be understood that numerous modifications may be made by those skilled in the art without actually departing from the scope of the invention. Accordingly, I wish to have it understood that I intend herein to cover all such modifications as fall within the true spirit and scope of my invention.

What I claim as new and desire to secure by Letters Patent of the United States is:

1. A high-frequency starting, operating, and control circuit comprising, in combination, a source of current, an inductor and a capacitor connected in series across said source and forming a series-resonant circuit, first and second controlled rectifiers connected in series across said source, said resonant circuit connected to the junction of said controlled rectifiers, a load connected across said inductor for energization thereby, and triggering means connected to said controlled rectifiers for alternate actuation thereof, whereby the alternate energizing of said controlled rectifiers provides controlled series resonance of said series-resonant circuit producing high-frequency voltage across said inductor for energizing said load.

2. A circuit as defined in claim 1, said triggering means comprising voltage-sensitive switching means connected to at least one of said controlled rectifiers, and an RC circuit connected to said current source and said switching means for actuating said switching means at predetermined time intervals.

3. A circuit as defined in claim 1, said triggering means comprising first voltage-sensitive switching means connected to one of said controlled rectifiers and a first RC circuit connected to said current source and said first switching means, and a second voltage-sensitive switching means connected to the other controlled rectifier and a second RC circuit connected to said second switching means.

4. A circuit as defined in claim 3, wherein said first switching means is a unijunction transistor connected to the gate of said one controlled rectifier and said second switching means is a unidirectional diode connected to the gate of said other controlled rectifier.

5. A circuit as defined in claim 4, said second RC circuit being connected across said other controlled rectifier.

6. A circuit as defined in claim 2, said voltage-sensitive switching means comprising a unijunction transistor having an emitter connected to said RC circuit and its bases connected across said current source.

7. A circuit as defined in claim 6, and voltage-clamping means connected to said unijunction transistor for providing a constant base-to-base voltage therefor.

8. A circuit as defined in claim 7, and variable-voltage means connected to said RC circuit for applying a predetermined voltage thereto.

9. A circuit as defined in claim 2, and pulse transformer means having primary winding means connected to aid voltage-sensitive switching means and secondary winding means connected to each controlled rectifier for separate actuation thereof.

10. A circuit as defined in claim 9, said voltage-sensitive switching means comprising a pair of unijunction transistors connected together at their emitters, each having a transformer primary winding connected to the output thereof.

11. A circuit as defined in claim 10, and a coupling capacitor connected to said unijunction transistors for providing alternate operation thereof.

12. A circuit as defined in claim 10, each said unijunction transistor having an RC circuit connected thereto and to said current source for actuating said unijunction transistors at predetermined time intervals, and voltage divider means connected to said RC circuits for applying a predetermined voltage thereto.

13. A circuit as defined in claim 1, said current source providing direct current, and a storage capacitor connected across said direct current source for charging thereby to provide instantaneous current at a minimum voltage.

14. A circuit as defined in claim 1, one of said controlled rectifiers being connected in series conduction relation with said resonant circuit, and the other controlled rectifier being connected across said resonant circuit.

15. A circuit as defined in claim 14, said resonant circuit including a second capacitor connected in parallel conduction relation with said first mentioned capacitor.

16. A circuit as defined in claim 1, and high-voltage generating means connected across said load for applying a high voltage for starting the same.

17. A circuit as defined in claim 16, said high-voltage generating means comprising an induction coil connected in series with said load, and charging capacitance means connected in series with a predetermined number of turns of said induction coil and forming therewith a discharge loop, said induction coil stepping up the voltage produced across said predetermined number of turns by operation of said discharge loop.

18. A circuit as defined in claim 2, impedance means connected in series with said load, and feedback means connected to said impedance means for sensing and compensating for variations of power supplied to said load.

19. A circuit as defined in claim 18, said feedback means comprising light-producing means connected to said impedance means, and photoconductor means arranged in proximity to said light-producing means and connected to said RC circuit for varying the voltage applied thereto in response to variations in light produced by aid light-producing means.

* * * * *